March 4, 1924.
M. ROUX
1,485,430
DIRECTION INDICATING APPARATUS
Filed Jan. 28, 1921
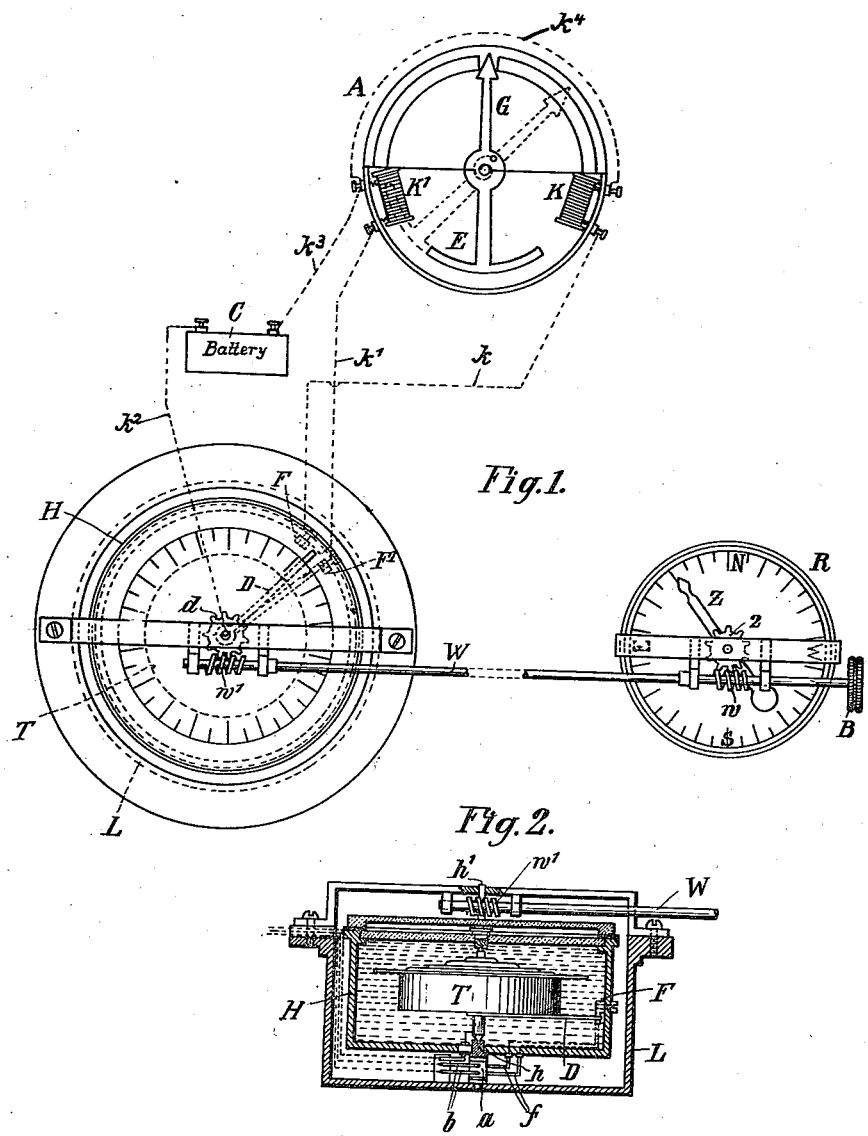
Inventor:
Marc Roux Patented Mar. 4, 1924.

1,485,430

UNITED STATES PATENT OFFICE.

MAX ROUX, OF BERLIN-FRIEDENAU, GERMANY.

DIRECTION-INDICATING APPARATUS.

Application filed January 28, 1921. Serial No. 440,733.

*To all whom it may concern:*

Be it known that I, MAX ROUX, a citizen of the Republic of Germany, residing at Berlin-Friedenau, Republic of Prussia, Germany, have invented certain new and useful Improvements in Direction-Indicating Apparatus, of which the following is a specification.

In aircraft manned by two persons it is preferably the pilot's duty to attend to the control and service of the engine, while the passenger or observer is more entrusted with the observation of the landscape. He must be quickly in a position to inform the pilot of all variations in the course resulting from compass, way or weather conditions. Ready comprehension, however, by calling to one another is almost impossible when the engine is running, so that hitherto a kind of sign-language has been resorted to. Now it is the object of this invention to provide an apparatus which avoids loss of time and misunderstanding.

In the drawing affixed to this specification and forming part thereof an aerial navigation apparatus, embodying my invention is illustrated by way of example.

In the drawing—

Fig. 1 is a schematical view of the whole apparatus.

Fig. 2 is a diametrical section through the magnetic compass.

The box H of a compass T (Figures 1 and 2) is mounted on a pivot $h$ and is connected in such manner to a shaft W which also is in communication with an indicator Z, arranged in front of the observer's seat over a compass card R (Figure 1), so that upon rotation of the shaft W the indicator Z and compass box H are displaced to the same angular amounts, but in the inverse direction. The shaft W is provided with two worms $w$ and $w^1$, of which the former meshes with a worm wheel 2 connected with the hand Z co-operating with the card R, and the other meshes with a worm-wheel $d$ secured to an upper pivot $h^1$ located co-axially with respect to the lower pivot $h$. The upper pivot is firmly connected with the box H whereby the rotary motions of the just-described transmission gearing is transmitted to the box. The worm $w$ is righthand, the worm $w^1$ lefthand. Therefore, the direction of rotation of the hand Z is reverse to that of the box H. Rigidly connected to the compass card of the compass T there swings with this a tongue D (Figures 1 and 2) between two electric contacts F and F' from which feed wires pass to the indicating mechanism A (Figure 1) arranged within view of the pilot. Here there is suspended, vertically and freely oscillating, the indicator G which at the bottom carries a circularly bent iron bar E which, according as to whether it is attracted by the solenoid coils K or K', causes the indicator to move either to the right or to the left.

The device works in the following manner:—

By turning the button B the observer fixes the course selected upon the compass card R with the aid of the indicator Z. The box H of the compass T is displaced to the same extent as the indicator Z, but in the inverse direction, so that the tongue D rigidly connected with the compass rose bears against one of the two contacts, say F' for example. The battery circuit is, thus, closed and the current passes over the contact $F^1$ to the coil $K^1$ whereby this is excited. Consequently, the iron core is attracted and drawn into said coil so that the hand G assumes the position indicated in dotted lines. The pilot learns in this way the direction he is required to take his course. If, however, the contact F is closed, the current passes through the coil K and the hand G is turned in the other direction. The hand returns to the middle or zero position only when the direction of flight of the machine is that to which the observer has turned the hand Z of the card R. When the machine is flying in this direction, the free end of the circuit closing tongue D lies between the contacts F and $F^1$ and neither coil is excited. The hand G is then in the position shown in full lines. The shaft W is turned by the knob B affixed to its free end at the card R.

The contact pieces F, $F^1$ are located inside the box H. They are connected with the coils K, $K^1$ by wires $k$, $k^1$, of which $k$ connects one end of the coil K with the contact-piece F, and $k^1$ connects one end of the coil $K^1$ with the contact-piece $F^1$. These connections are not direct ones, as might seem from the diagram shown in Figure 1, but is effected by the mediation of two sliding springs $f$, Figure 2, and two oppositely located sliding springs $b$ which are conductively connected with $f$ by a metallic member $a$ forming a part of the pivot $h$. The axle of the compass T is insulated from the springs $b$ and $f$, but conductively connected by a wire $k^2$ with one pole of the battery C, the other pole of which is connected by wires $k^3$ and $k^4$ with the other ends of the coils K, K$^1$. The contact pieces F, F$^1$ are, thus, turned in the one or the other direction by the mediation of the box H which in its turn is rotated by the worm-wheel $d$ and the worm $w^1$, as described. The circuit-closing or breaking tongue D is firmly attached to the compass, as illustrated in Figure 2, and the one or the other circuit is closed as soon as the tongue contacts with the one or the other of the contacts F, F$^1$, depending upon the direction of the rotation of the box H relatively to the compass T.

Having now described my invention what I desire to secure by a patent of the United States is:

In a direction indicating apparatus, the combination of a compass card, a rotatable pointer associated therewith, a magnetic compass spaced from said card and comprising a frame, a compass box pivotally mounted therein, spaced insulated contacts carried by said box a needle element pivotally mounted in said box and adapted to make and break electric circuits through said contacts respectively, means forming circuits connected to said contacts indicating means in said circuits and adapted to be controlled thereby, and manually operable means associated with said pointer and said box and adapted to simultaneously rotate each.

In testimony whereof I have affixed my signature in presence of two witnesses.

MAX ROUX.

Witnesses:
 OTTO E. ZOEPKE,
 ROSE STAHL.